Figure 1:
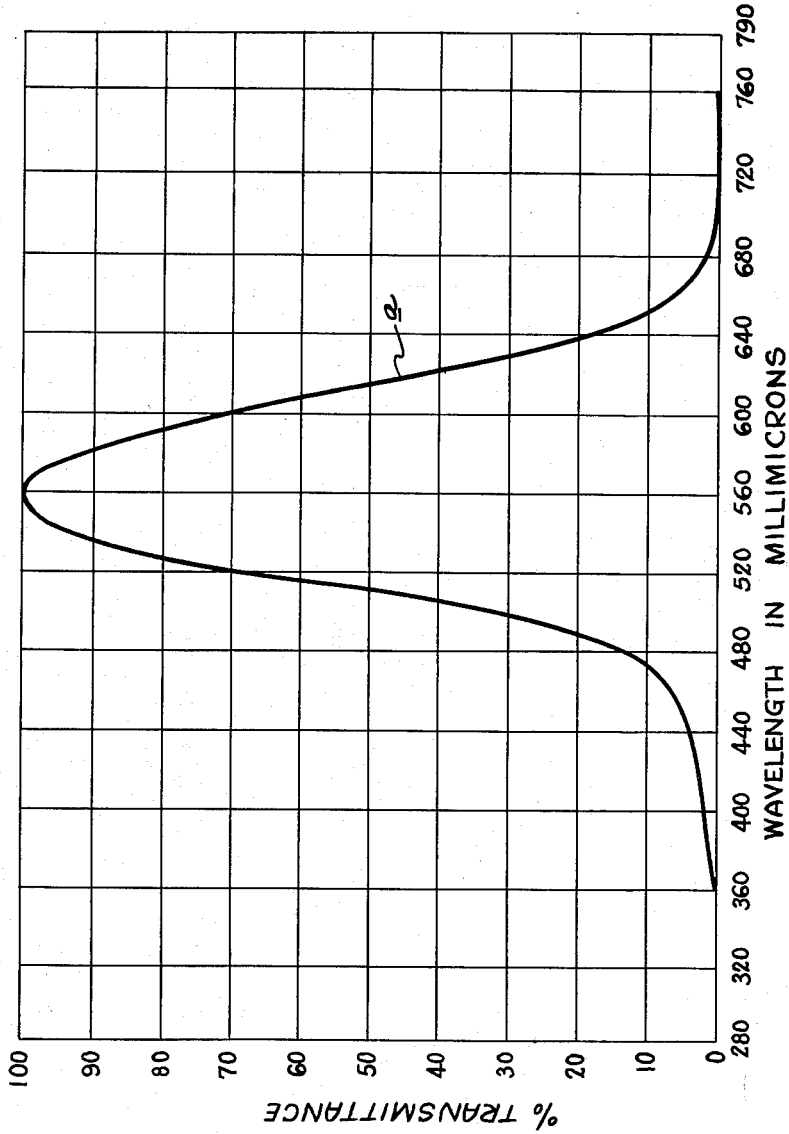

March 24, 1964   R. W. YOUNG   3,126,295
ABSORPTIVE GLASS AND METHOD OF MAKING THE SAME
Filed Aug. 31, 1961   2 Sheets-Sheet 1

INVENTOR
ROBERT W. YOUNG
BY Louis L. Gagnon
James P. McAndrews
ATTORNEYS

March 24, 1964 R. W. YOUNG 3,126,295
ABSORPTIVE GLASS AND METHOD OF MAKING THE SAME
Filed Aug. 31, 1961 2 Sheets-Sheet 2
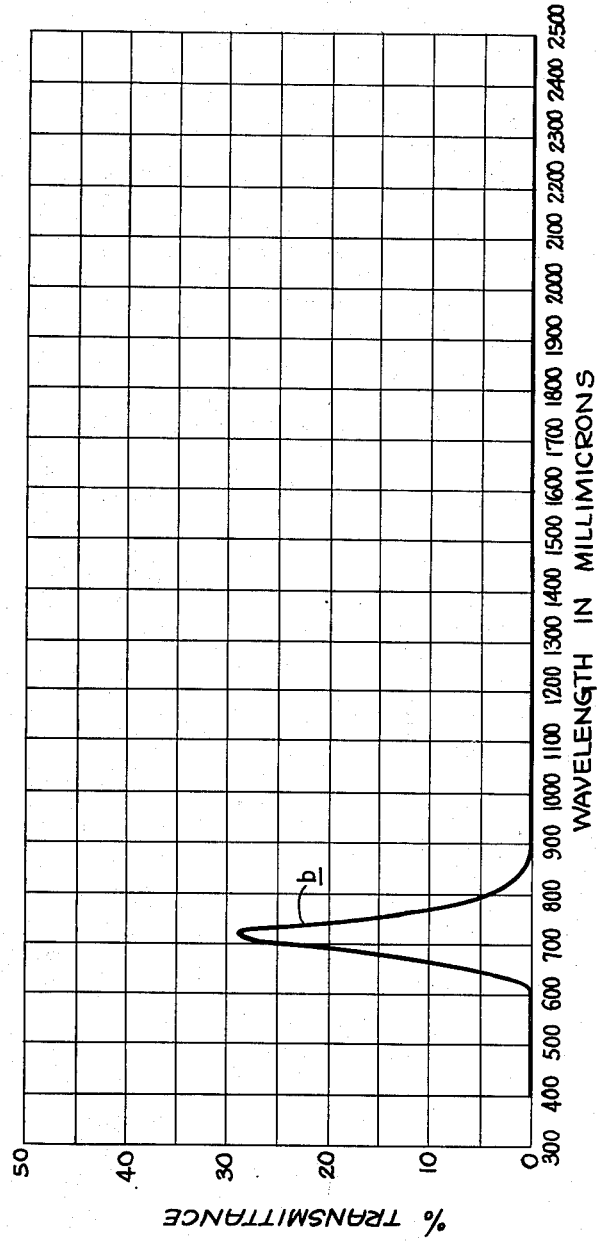
INVENTOR
ROBERT W. YOUNG
BY *Louis L. Gagnon*
*James P. McAndrews*
ATTORNEYS 3,126,295
ABSORPTIVE GLASS AND METHOD OF MAKING THE SAME
Robert W. Young, Woodstock, Conn., assignor to American Optical Company, Southbridge, Mass., a voluntary association of Massachusetts
Filed Aug. 31, 1961, Ser. No. 135,225
8 Claims. (Cl. 117—33.3)

The field of this invention is that of glass compositions, and the invention relates more particularly to novel and improved glass materials, and to methods of making such materials, for use in protecting the eyes from flash radiations due to atomic blasts, the glass composition being adapted for ultraviolet and infrared absorption and for transmission of visible light of selected wavelengths.

A principal object of the present invention is to provide a relatively inexpensive, stable glass material which can be employed in goggles or other filter media for protecting the eyes of pilots or other persons who might be exposed to flash radiations from atomic blasts.

It is also an object of this invention to provide a novel and improved glass material which can be employed in the form of absorptive lenses or other vision-protecting filter media of about two millimeters' thickness for peak transmission of light of wavelengths between 670 and 740 millimicrons and for substantially complete absorption of light of wavelengths shorter than 600 millimicrons and longer than 860 millimicrons. Such a glass material can be adapted to permit at least limited vision through the glass when the material is disposed in protecting relation to the eyes but can provide substantial protection for the eyes from ultraviolet, infrared and selected visible light radiations resulting from an atomic blast. When such a glass material is removed from protecting relation to the eyes following an atomic blast, vision, even in dim light as is most important, will be at substantially normal levels.

Another object of this invention is to provide a glass composition comprising as major ingredients:

| | Percent by weight |
|---|---|
| Aluminum oxide, $Al_2O_3$ | 15 to 20 |
| Phosphorus pentoxide, $P_2O_5$ | 65 to 80 |
| Ferric oxide, $Fe_2O_3$ | 1.5 to 4 |
| Nickelic oxide, $Ni_2O_3$ | 3 to 5 |
| Ceric oxide, $CeO_2$ | 2 to 9 | the glass being adapted to display transmissive and absorptive characteristics as previously described.

Other objects and advantages of this invention appear in the following detailed description of the glass materials and methods of glass manufacture provided by this invention, the detailed description referring to the drawing in which:

FIG. 1 illustrates the normal sensitivity of the eye to light of different wavelengths; and FIG. 2 illustrates the transmittance of one embodiment of the glass material provided by this invention.

A pilot or other person in the vicinity of an atomic blast may need to rely upon his vision throughout a period during which the atomic blast occurs so that, even though he does not directly observe the blast, he will require protection of his vision from indirect flash radiations caused by the blast. As will be understood, the protection should include shielding of his vision from ultraviolet and infrared radiations and should also include substantial shielding of his vision from radiations of visual light resulting from the blast. In this regard, it can be seen by reference to curve $a$ in FIG. 1 that the eye is normally sensitive to light radiations of wavelengths between 400 and 760 millimicrons with sensitivity to light of about 555 millimicrons wavelength being substantially greater than sensitivity to light of about 700 millimicrons' wavelength. It should also be noted that, in dim light, the eye is significantly more sensitive to visible light of the shorter wavelengths.

Accordingly, it has been found that an optical filter medium having transmissive and absorptive characteristics for a member of about 2 millimeters' thickness as illustrated by curve $b$ in FIG. 2 is most advantageous for the protection purposes above described. With peak transmission of approximately 29 percent for light of wavelengths between 670 and 740 millimicrons, adequate vision through the filter medium is possible by means of ambient red light during the period in which protection is provided by the filter. However, the sharp cut-off or absorption of radiations of wavelengths shorter than 600 millimicrons' wavelength and longer than 860 millimicrons' wavelength assures adequate protection of vision from the effects of ultraviolet and infrared radiations caused by an atomic blast. Further, the filter medium is adapted to completely shield the eyes from exposure to visible light of the shorter wavelengths during the atomic blast so that, when the protective medium is removed from the eyes following the blast, vision, even in dim light as is most important, will be at substantially normal levels. Until the present invention, red-transmitting, infrared and ultraviolet-absorbing filters intended for the above-described purposes could not be molded from a single glass but were generally formed of laminations of different glasses which had to be cemented together.

The glass filter material provided by this invention embodies aluminum oxide ($Al_2O_3$) and phosphorus pentoxide ($P_2O_5$) as its major ingredients and also embodies ferric oxide ($Fe_2O_3$), nickelic oxide ($Ni_2O_3$) and ceric oxide ($CeO_2$) as colorants for determining the transmissive and absorptive characteristics of the material, the glass material having a calculated oxide composition as follows:

| | Percent by weight |
|---|---|
| Aluminum oxide, $Al_2O_3$ | 15 to 20 |
| Phosphorus pentoxide, $P_2O_5$ | 65 to 80 |
| Ferric oxide, $Fe_2O_3$ | 1.5 to 4 |
| Nickelic oxide, $Ni_2O_3$ | 3 to 5 |
| Ceric oxide, $CeO_2$ | 2 to 9 |

The inclusion of aluminum oxide in this glass composition in the described proportion relative to the phosphorus pentoxide content of the composition permits melting and fining of the glass at conventional temperatures on the order of 2500–2700° F. and also assures a clear, stable and homogeneous glass which will not deteriorate when exposed to moisture. The phosphorus pentoxide content of the glass provides an excellent carrier for the ferric and nickelic oxide colorants, whereby the glass is adapted for substantial visible and infrared absorption without excessively reducing the transmittance of the glass for red light of the visible wavelengths. That is, where the ferric and nickelic oxide colorants are maintained in the described percentage relationships within a phosphate-based glass, these oxides apparently react to assure adequate absorption of the desired wavelengths of visible light and to provide for sharp cut-off of visible light of wavelengths shorter than 600 millimicrons and also to assure adequate absorption of infrared light and to provide for sharp cut-off of infrared light of wavelengths longer than 860 millimicrons. The ceric oxide embodied in the glass provides for absorption of ultraviolet light.

Although various conventional ingredients can be employed for achieving the desired calculated percentages of the aluminum oxide and phosphorus pentoxide constituents of the glass material, it will be understood that phosphorus pentoxide by itself is somewhat dangerous to work with and is preferably not employed as a batch ingredient. Accordingly, a preferred batch composition comprises:

| | Parts by weight |
|---|---|
| Aluminum metaphosphate, Al(PO$_3$)$_3$ | 400 |
| Ferric oxide (Fe$_2$O$_3$) | 12 |
| Nickelic oxide (Ni$_2$O$_3$) | 20 |
| Ceric oxide (CeO$_2$) | 30 |

The calculated oxide composition of a glass prepared from such batch ingredients may be expressed in either of the following manners depending upon the form in which the nickel embodied in the composition is to be expressed:

| | Percent by Weight | |
|---|---|---|
| Aluminum Oxide, Al$_2$O$_3$ | 16.8 | 16.9 |
| Phosphorus Pentoxide, P$_2$O$_5$ | 71.4 | 71.7 |
| Ferric Oxide, Fe$_2$O$_3$ | 2.3 | 2.3 |
| Ceric Oxide, CeO$_2$ | 5.7 | 5.7 |
| Nickel expressed as Nickelic Oxide, Ni$_2$O$_3$ | 3.8 | X |
| Nickel expressed as Nickelous Oxide, NiO | X | 3.4 |

As will be understood by those skilled in the glass-making art, the calculated oxide composition of the glass material can be expressed in whichever of these ways is arbitrarily selected by the person calculating the glass composition.

According to this invention, the above-described batch ingredients are weighed out and mixed in conventional manner and are then placed in a refractory clay pot, a platinum pot or in an alumina silica (mullite type) pot to be melted. The pot is then placed in a conventional gas-fired or electric furnace, such as the electric furnace commercially known as a Glo-Bar furnace, for melting the batch ingredients at a temperature between 2500° F. and 2700° F. The glass batch is preferably melted under neutral or mildly oxidizing conditions for preventing formation of aluminum phosphate which would be more difficult to dissolve in the glass melt. Where the batch is melted in an electric Glo-Bar furnace, such neutral or mildly oxidizing conditions will normally be established without other controls but where a gas-fired furnace is employed for melting the glass batch the neutral or oxidizing conditions should be established and maintained in conventional manner. As the glass batch melts, additional batch material is added until the pot is filled or until the desired batch size has been achieved. For a pot holding about 100 pounds of batch ingredients, filling of the pot will require between 5 and 7 hours. After melting has been completed, the melted batch is maintained at the described temperature for three or four hours during fining of the batch in conventional manner. Thereafter, the melted glass batch can be gradually cooled in the furnace while the batch is stirred and can be cast when the batch is at a temperature between 2200° F. and 2400° F. Where the cast glass has a thickness of approximately 3 millimeters, the glass can be annealed at a temperature of about 1100° F. for about one hour and can be gradually cooled to room temperature over a period of about 5 hours in conventional manner.

A glass material prepared according to this invention has a chemical analysis as follows:

| | Percent by weight |
|---|---|
| Aluminum oxide (Al$_2$O$_3$) | 17.52 |
| Potassium oxide (K$_2$O) | 0.05 |
| Sodium oxide (Na$_2$O) | 0.10 |
| Nickelous oxide (NiO) | 4.29 |
| Phosphorus pentoxide (P$_2$O$_5$) | 68.39 |
| Ceric oxide (CeO$_2$) | 6.43 |
| Ferric oxide (Fe$_2$O$_3$) | 3.07 |

The content of phosphorus pentoxide disclosed by chemical analysis may be slightly lower than the calculated glass composition of a particular glass material due to slight volatilization of the phosphorus pentoxide during melting and fining of the batch ingredients, and of course, such a slight percentage reduction of the P$_2$O$_5$ content of the glass material will result in a correspondingly increased percentage content of the other glass constituents. The sodium and potassium oxides found in the glass material by chemical analysis are present as impurity contaminations and were probably absorbed during melting of the batch ingredients in a refractory clay pot.

The particular glass composition which has been described above by reference to its preferred batch composition and its specific calculated oxide composition displays highly desirable absorptive and transmissive characteristics as well as other advantageous physical properties. A two-millimeter thickness of the glass material is adapted for peak transmission of about 29 percent for light of wavelengths between 710 and 715 millimicrons as illustrated in FIG. 2. The transmittance of the glass drops sharply for light of other wavelengths and provides substantially zero transmittance for light of wavelengths below 605 millimicrons and above 860 millimicrons. The glass can be conveniently molded without injuring its transmissive and absorptive properties and can be conveniently ground and polished to form lenses or other similar articles. The glass is stable and will not deteriorate when exposed to moisture attack.

According to this invention, the glass material herein disclosed can be provided with various films or coatings for adjusting total visual transmittance of the material in conventional manner. For example, where the described glass material is to be employed for shielding the eyes from the flash radiations caused by atomic blasts, the glass material is preferably provided with a uniform coating of some other highly reflective material which is adapted to reduce transmission of light of all visible wavelengths to substantially the same extent. An Inconel coating of a metallic alloy embodying substantially 80% nickel, 14% chromium, 6% iron, 0.2% copper, 0.25% manganese, 0.25% silicon, and 0.08% carbon such as is presently sold under the trademark Inconel can be applied to the glass material in a conventional manner such as by placing the glass material within a bell jar and by applying the coating thereto by means of the well known evaporation process. In a preferred embodiment of this invention, where a filter member is to embody a plate of the described glass material of two millimeter thickness, a uniform Inconel coating is preferably applied to one side of the plate, the coating being of such a thickness as to provide overall visual transmittance for the member of approximately 1 percent.

Having described my invention, I claim:

1. A glass material having a calculated oxide composition comprising:

| | Percent by weight |
|---|---|
| Aluminum oxide, Al$_2$O$_3$ | 15 to 20 |
| Phosphorus pentoxide, P$_2$O$_5$ | 65 to 80 |
| Ferric oxide, Fe$_2$O$_3$ | 1.5 to 4 |
| Nickelic oxide, Ni$_2$O$_3$ | 3 to 5 |
| Ceric oxide, CeO$_2$ | 2 to 9 | a 2 millimeter thickness of said glass composition having properties for peak transmission of light of wavelengths between 670 and 740 millimicrons and for substantially complete absorption of light of wavelengths shorter than 600 millimicrons and longer than 860 millimicrons.

2. A glass composition resulting from the combining of:

| | Parts by weight |
|---|---|
| Aluminum metaphosphate, Al(PO$_3$)$_3$ | 400 |
| Ferric oxide, Fe$_2$O$_3$ | 12 |
| Nickelic oxide, Ni$_2$O$_3$ | 20 |
| Ceric oxide, CeO$_2$ | 30 | a 2 millimeter thickness of said glass composition having properties for peak transmission of light of wavelengths between 670 and 740 millimicrons and for substantially complete absorption of light of wavelengths shorter than 600 millimicrons and longer than 860 millimicrons.

3. A glass material having a calculated oxide composition comprising:

| | Percent by weight |
|---|---|
| Aluminum oxide, $Al_2O_3$ | 16.8 |
| Phosphorus pentoxide, $P_2O_5$ | 71.4 |
| Ferric oxide, $Fe_2O_3$ | 2.3 |
| Nickelic oxide, $Ni_2O_3$ | 3.8 |
| Ceric oxide, $CeO_2$ | 5.7 | a 2 millimeter thickness of said glass material having properties for peak transmission of light of wavelengths between 670 and 740 millimicrons and for substantially complete absorption of light of wavelengths shorter than 600 millimicrons and longer than 850 millimicrons.

4. A glass material having a chemical analysis substantially as follows:

| | Percent by weight |
|---|---|
| Aluminum oxide, $Al_2O_3$ | 17.52 |
| Potassium oxide, $K_2O$ | 0.05 |
| Sodium oxide, $Na_2O$ | 0.10 |
| Nickel as nickelous oxide, NiO | 4.29 |
| Phosphorus pentoxide, $P_2O_5$ | 68.39 |
| Cerium as ceric oxide, $CeO_2$ | 6.43 |
| Total iron as ferric oxide, $Fe_2O_3$ | 3.07 | wherein the potassium oxide and sodium oxide are present as impurity contaminations, a 2 millimeter thickness of said material having properties for peak transmission of light of wavelengths between 670 and 740 millimicrons and for substantially complete absorption of light of wavelengths shorter than 600 millimicrons and longer than 860 millimicrons.

5. A protective filter member comprising a 2 millimeter thickness of the glass material set forth in claim 1, having a coating thereon of a metallic alloy embodying substantially 80% nickel, 14% chromium, 6% iron, 0.2% copper, 0.25% manganese, 0.25% silicon, and 0.08% carbon, said coating being of a thickness which is adapted to provide total visual transmittance for the member of approximately 1 percent.

6. A protective filter member comprising a 2 millimeter thickness of the glass material set forth in claim 2, having a coating thereon of a metallic alloy embodying substantially 80% nickel, 14% chromium, 6% iron, 0.2% copper, 0.25% manganese, 0.25% silicon, and 0.08% carbon, said coating being of a thickness which is adapted to provide total visual transmittance for the member of approximately 1 percent.

7. A protective filter member comprising a 2 millimeter thickness of the glass material set forth in claim 3, having a coating thereon of a metallic alloy embodying substantially 80% nickel, 14% chromium, 6% iron, 0.2% copper, 0.25% manganese, 0.25% silicon, and 0.08% carbon, said coating being of a thickness which is adapted to provide total visual transmittance for the member of approximately 1 percent.

8. A protective filter member comprising a 2 millimeter thickness of the glass material set forth in claim 4 having a coating thereon of a metallic alloy embodying substantially 80% nickel, 14% chromium, 6% iron, 0.2% copper, 0.25% manganese, 0.25% silicon, and 0.08% carbon, said coating being of a thickness which is adapted to provide total visual transmittance for the member of approximately 1 percent.

References Cited in the file of this patent

UNITED STATES PATENTS

| | | |
|---|---|---|
| 1,830,903 | Hood | Nov. 1, 1931 |
| 2,031,958 | Kaufman et al. | Feb. 25, 1936 |
| 2,393,469 | Hooley | Jan. 22, 1946 |
| 2,409,356 | Hutchings | Oct. 15, 1946 |
| 2,532,386 | Armistead | Dec. 5, 1950 |
| 2,675,740 | Barkley | Apr. 20, 1954 |
| 2,854,349 | Dreyfus et al. | Sept. 30, 1958 |
| 2,913,350 | Upton | Nov. 17, 1959 |
| 2,964,427 | Rheinberger et al. | Dec. 13, 1960 |